Figure 1:
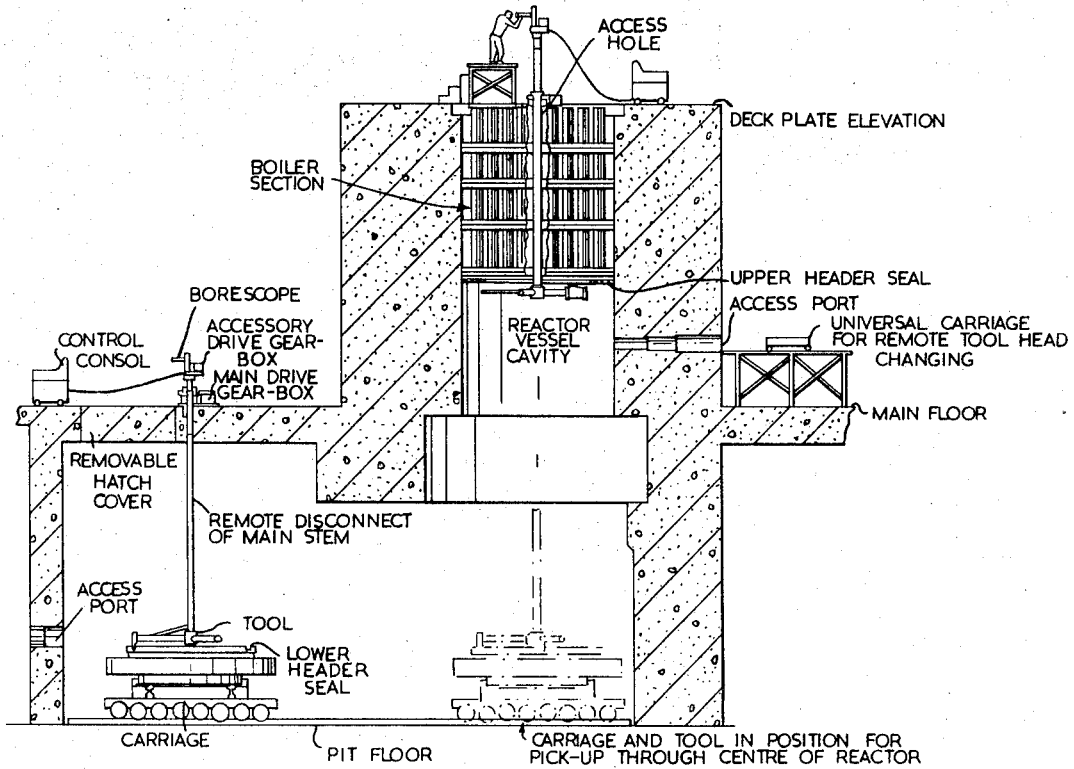

United States Patent

[11] 3,597,933

| [72] | Inventor | Cyril J. Astill<br>Deep River, Ontario, Canada |
|---|---|---|
| [21] | Appl. No. | 760,213 |
| [22] | Filed | Sept. 17, 1968 |
| [45] | Patented | Aug. 10, 1971 |
| [73] | Assignee | Atomic Energy of Canada Limited<br>Ottawa, Ontario, Canada |

[54] REMOTE GRINDING HEAD
5 Claims, 27 Drawing Figs.

| [52] | U.S. Cl. | 51/165.87 |
|---|---|---|
| [51] | Int. Cl. | B24b 49/00 |
| [50] | Field of Search | 51/165.14, 165.15 |

[56] References Cited
UNITED STATES PATENTS

| 1,865,067 | 6/1932 | Warsow | 51/165 UX |
|---|---|---|---|
| 2,545,730 | 3/1951 | Fouquet | 51/165 X |
| 2,576,239 | 11/1951 | Reimschissel et al. | 51/165 X |
| 2,944,373 | 7/1960 | Mentley et al. | 51/165 X |

Primary Examiner—Lester M. Swingle
Attorney—Cushman, Darby & Cushman

ABSTRACT: There is provided a apparatus for the automatic compensation for deterioration or reduction in diameter of a cutting tool, such as a grinding wheel, whereby machining may be resumed, without further adjustment after such compensation. The invention is particularly suitable for remote operation under hazardous conditions such as might be experienced in highly radioactive environments.

Patented Aug. 10, 1971

3,597,933

22 Sheets-Sheet 4

LINEAR SURFACE SPEED:
17 INS/MIN.
CHART SPEED: 20 INS/MIN.

LINEAR SURFACE SPEED:
9 INS/MIN.
CHART SPEED 100 INS/MIN.

REMOTE GRINDING HEAD

This invention relates to apparatus for the resurfacing or machining of accurate surfaces by remote control. The invention contemplates remote cleaning, honing, lapping or grinding of such surfaces together with profilometer tracing of critical surfaces. The invention has particular, but not exclusive use in the machining or reconditioning of surfaces, in hazardous environments and was developed primarily for use in highly active radiation fields. The development was initiated to facilitate the machining of 11½-foot diameter sealing surfaces on a nuclear reactor vessel, wherein the radioactive environment was 28 feet below the working level and access for control of the equipment was through a 4.7-inch diameter hole.

In the particular nuclear reactor for which the present invention was developed, mockup tests shows that water will leak through 0.001-inch-deep scratches across the contact path or a pit mark extending across the path of a sealing ring. It was found that a surface finish of better than about 16 microinches was necessary. When grinding to such a high degree of exactness on an 11-foot, 6-inch diameter seal surface it is necessary to dress the wheel after about 3 to 4 linear feet of grinding. This procedure requires the ability to return the grinding wheel to its original depth of cut after remotely dressing the wheel.

It is an object of one aspect of the invention to provide apparatus for redressing the cutting surface of a cylindrical machining wheel in such a manner that machining can be recommenced after redressing without discontinuity in the surface produced and without the need for making dimensional measurements.

In accordance with the foregoing aspect of the invention, use of the apparatus preferably comprises the steps of: moving said wheel diametrally in a selected direction by an accurately determined distance X units, moving a dressing tool having an axis of movement during dressing disposed parallel to the axis of rotation of said wheel in the same selected direction by an amount equal to 2X units from that used for initial dressing of the wheel toward said wheel, and, performing the redressing operation.

The object of another feature of the invention is to provide a toolhead for cylindrical machining tools wherein there is provided automatic compensation for the material removed from the tool during redressing.

According to this further aspect of the invention the toolhead comprises: shaft and bearing means providing an axis about which said tool may rotate, means for supporting said bearing, a dressing device, means slidably supporting said dressing device whereby the latter is engageable with the cylindrical surface of said tool and whereby the dressing device constrained to move along an axis which is parallel to and in the same plane as that of the shaft, means for moving the said axis away from said dressing device by an accurately determined distance X, the movement occurring in said plane, and, means for moving the dressing device toward said tool by an accurately determined distance 2X, the movement occurring in said plane.

Figure 2:
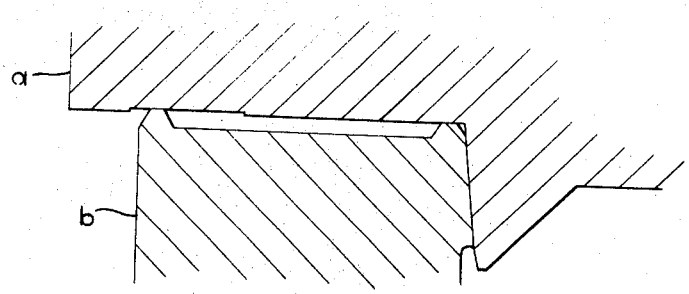
Figure 14:
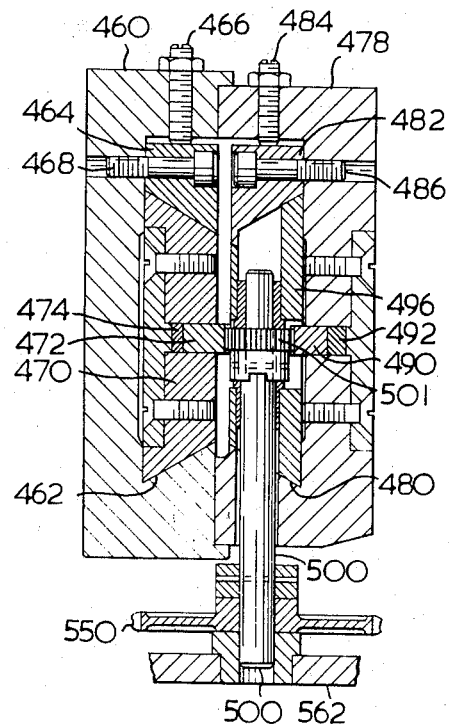
Figure 3A:
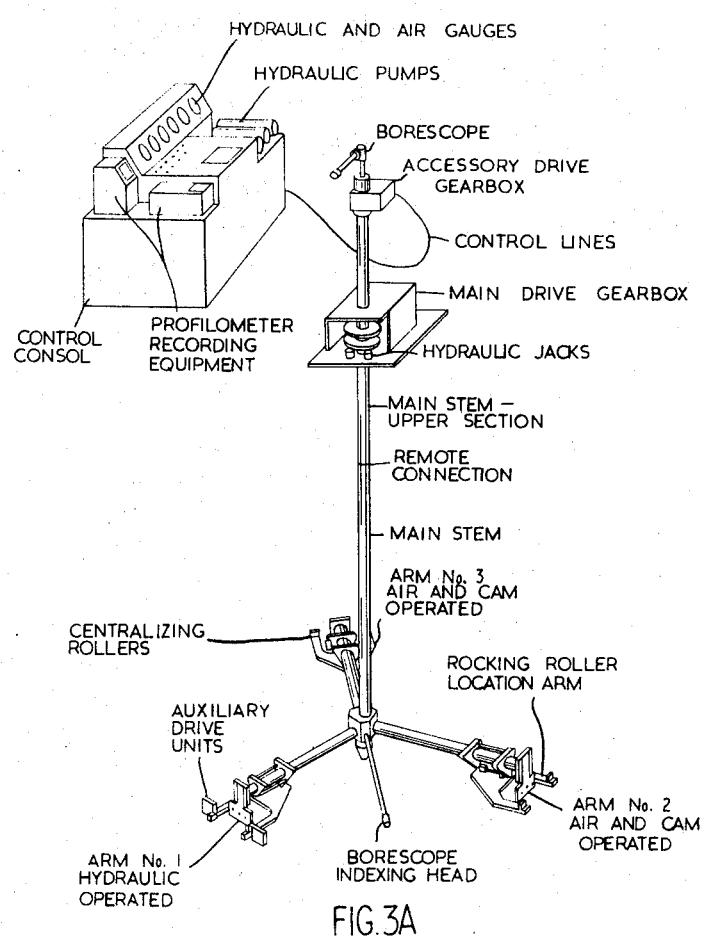
Figure 3B:
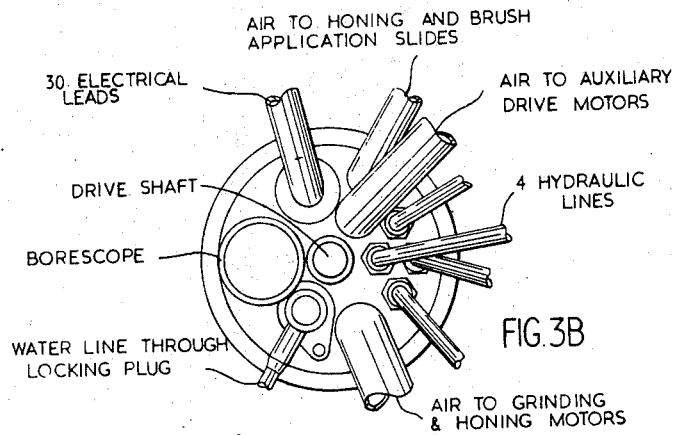
Figure 3C:
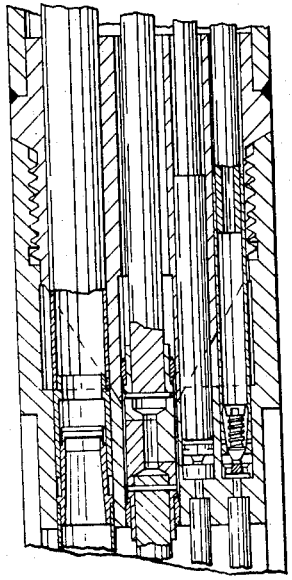
Figure 4:
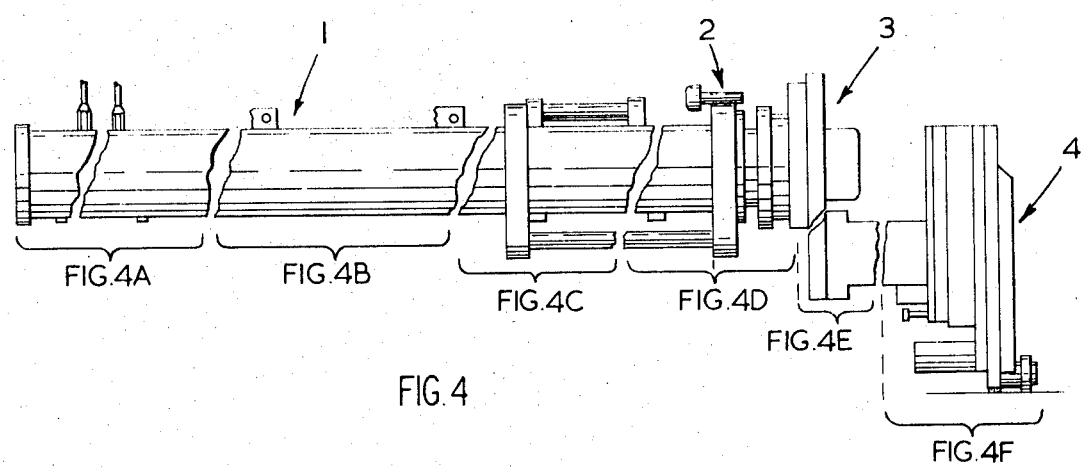
Figure 4A:
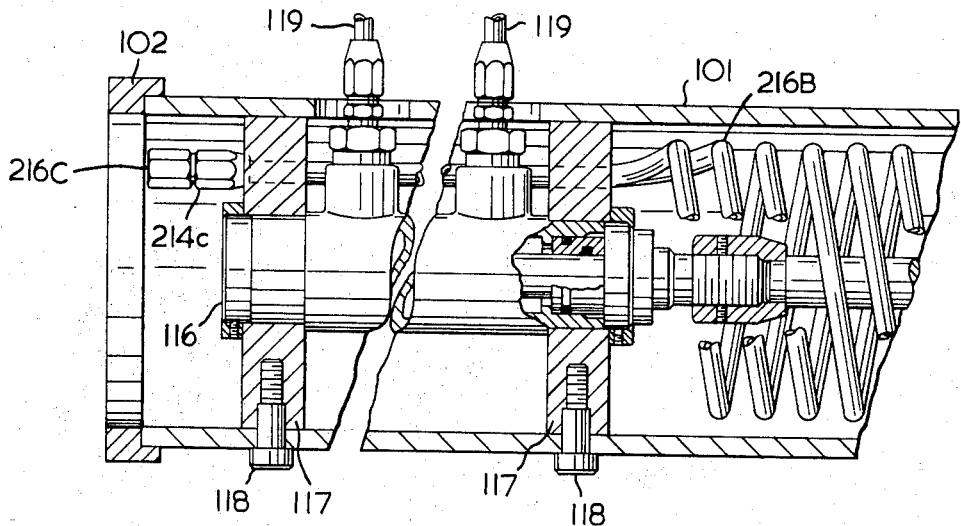
Figure 4B:
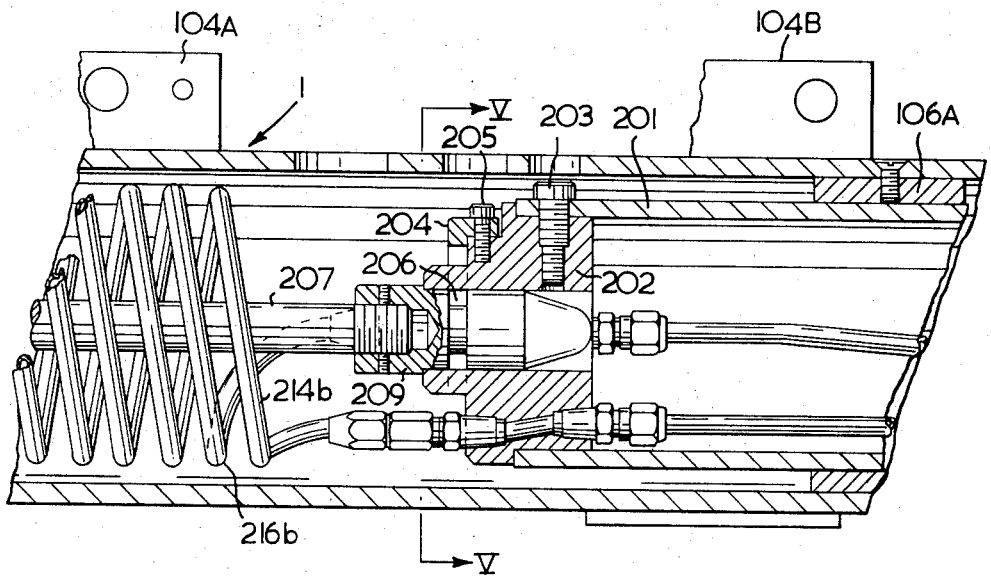
Figure 4C:
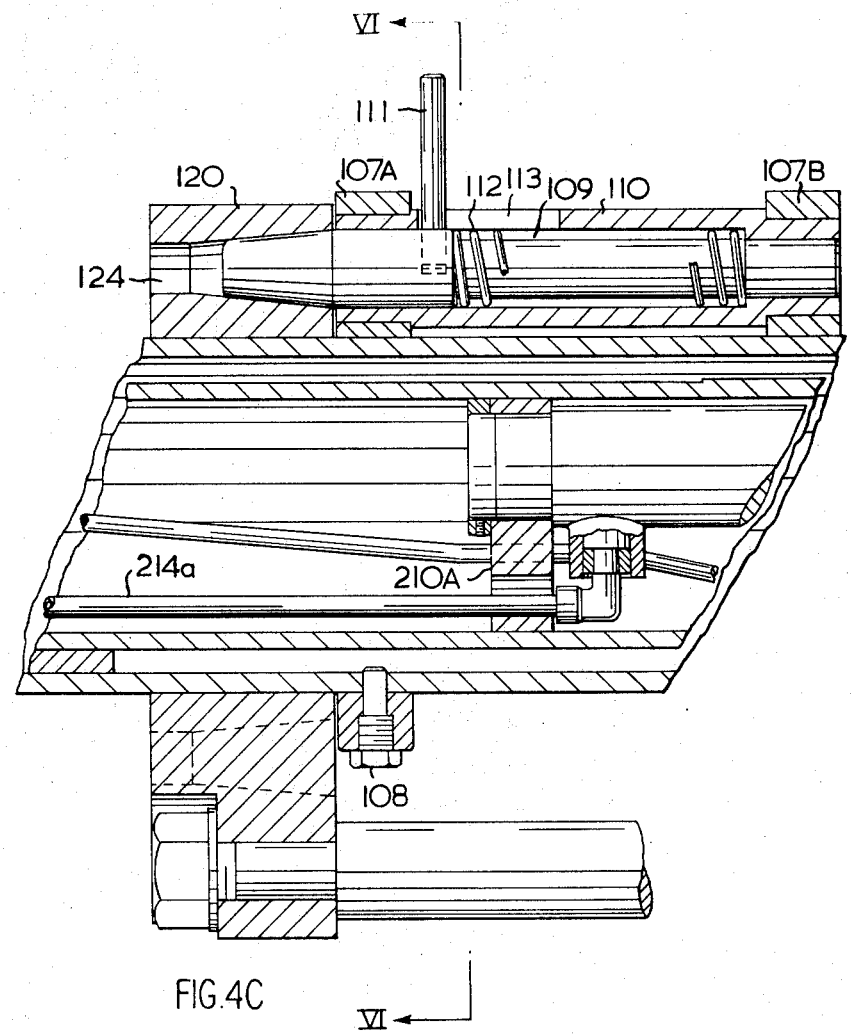
Figure 4E:
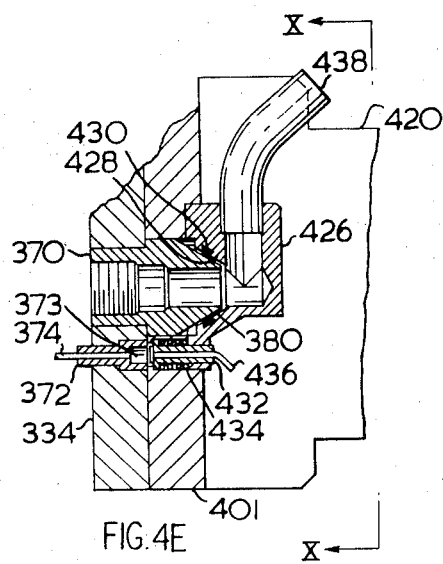
Figure 4D:
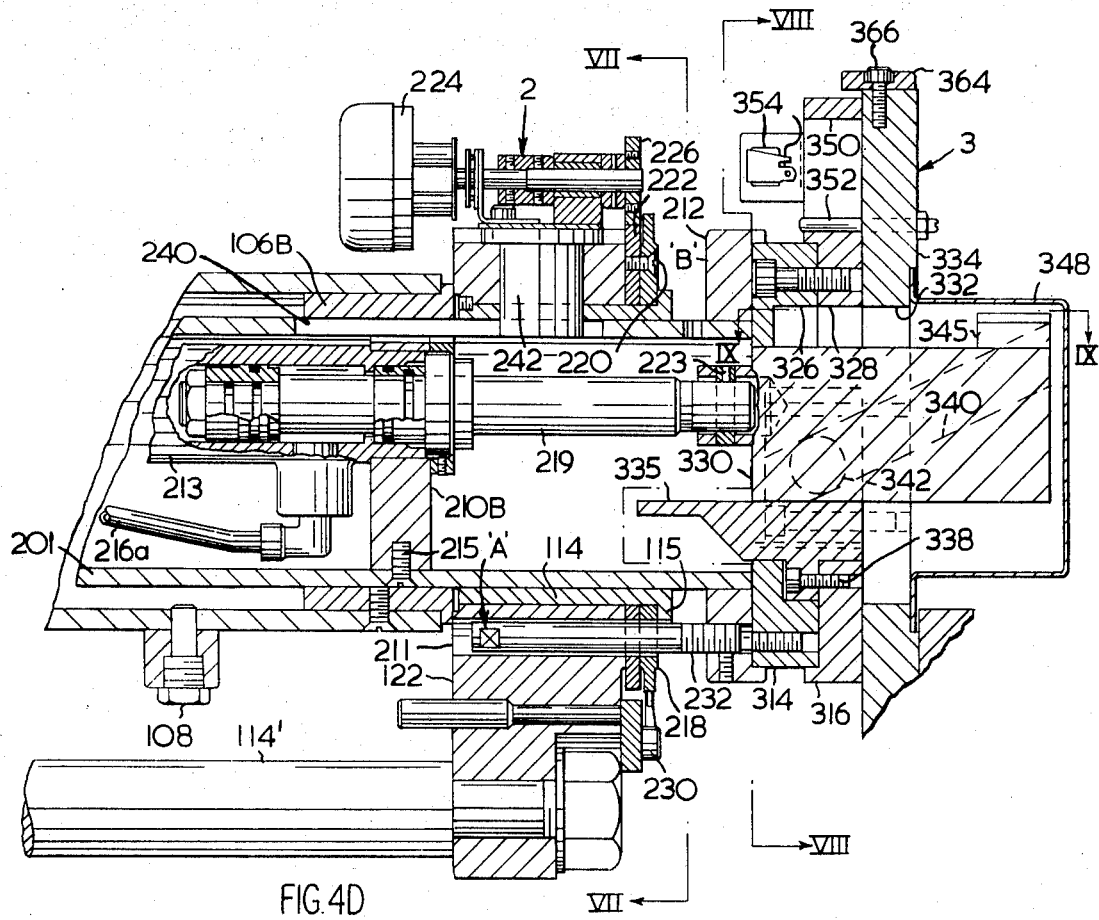
Figure 4F:
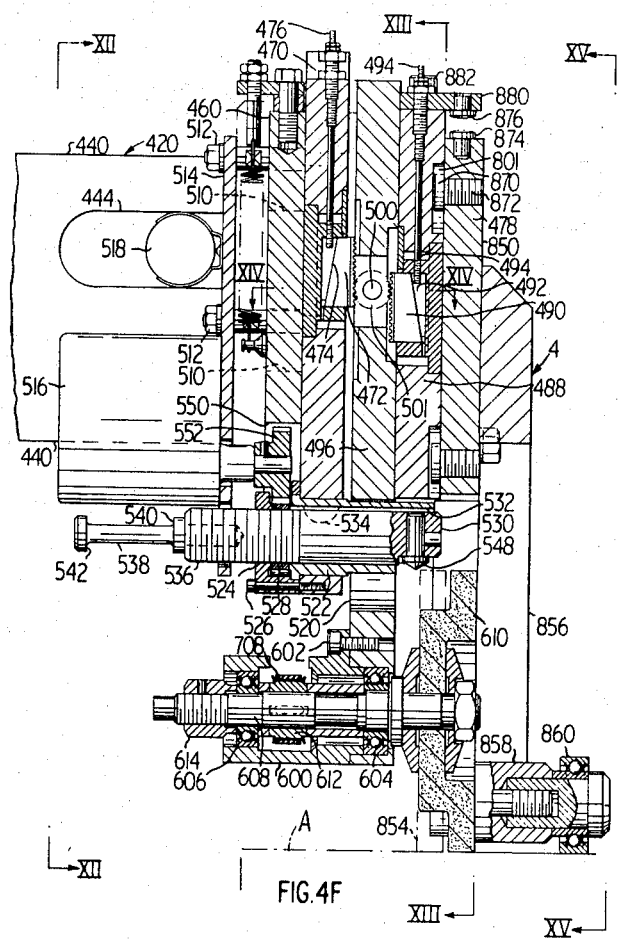
Figure 5:
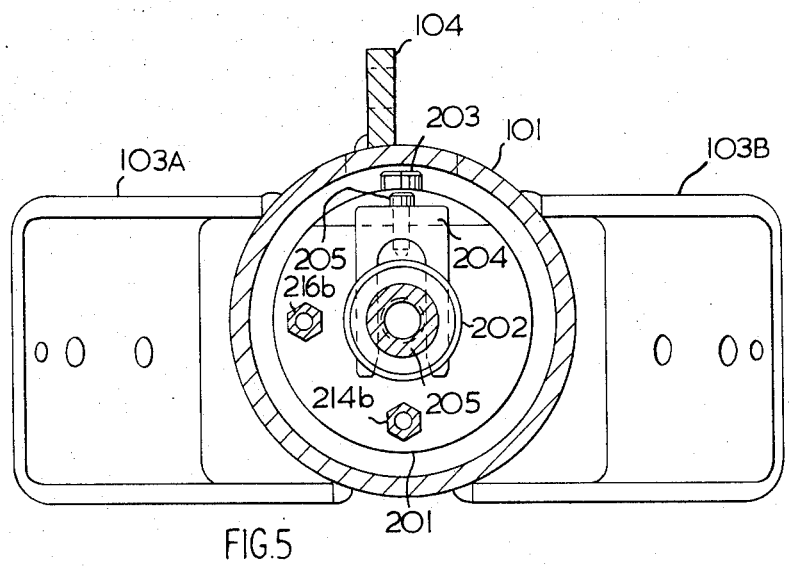
Figure 6:
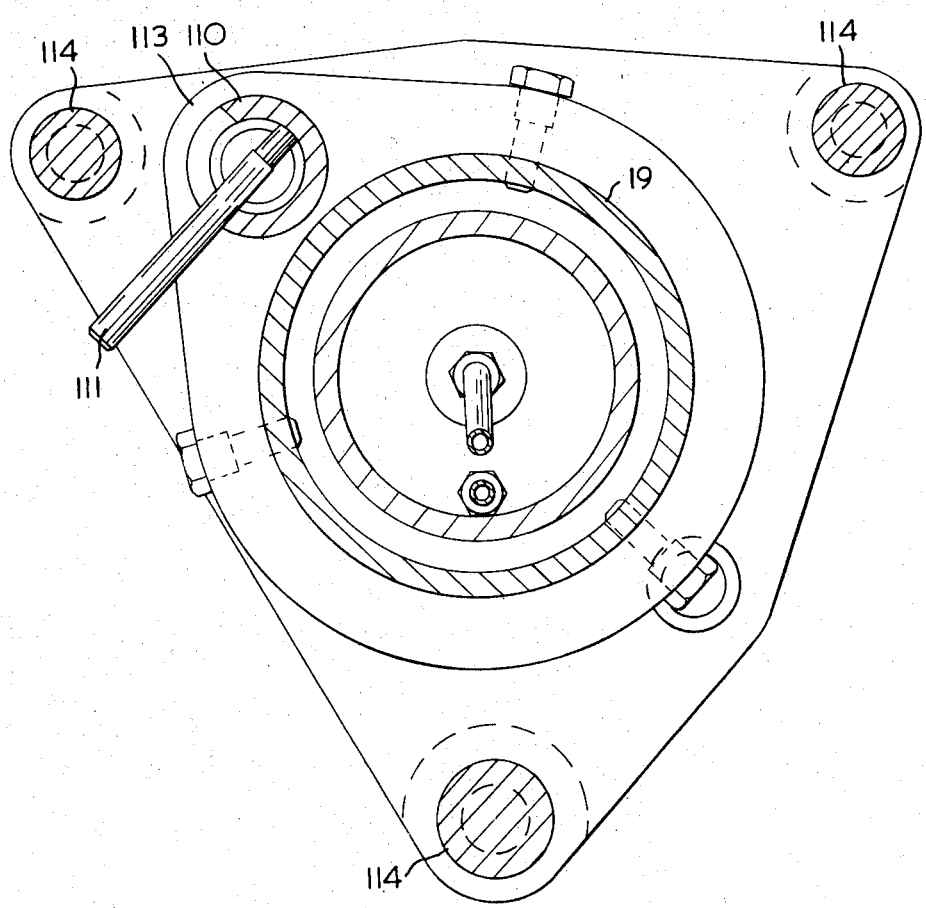
Figure 7:
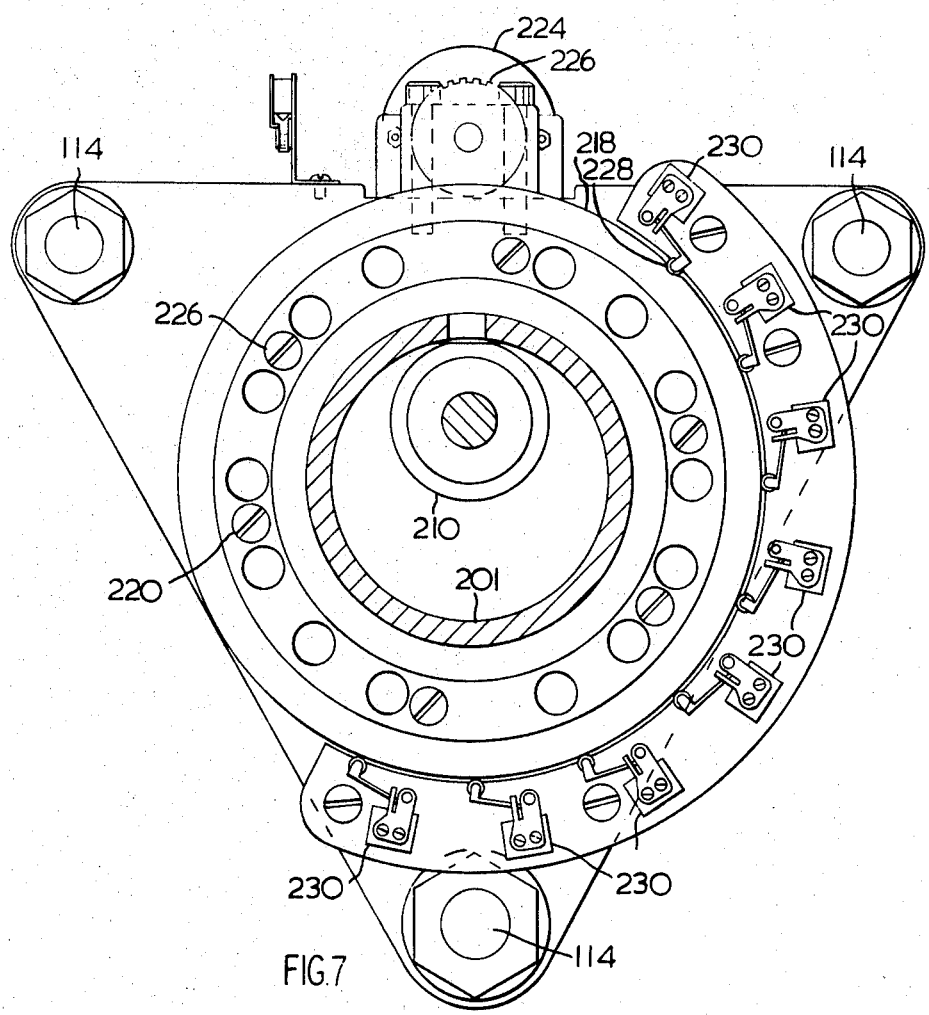
Figure 8:
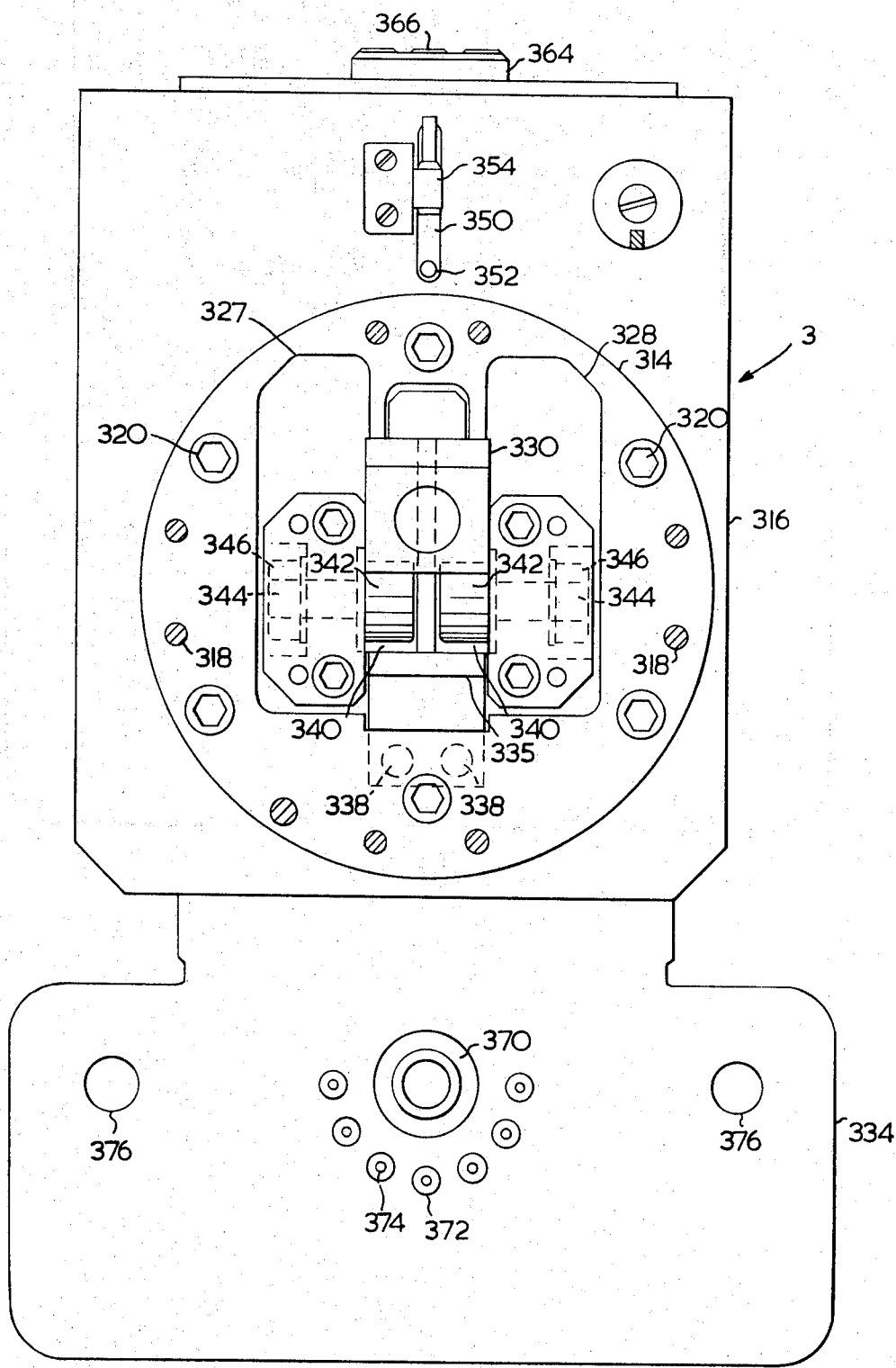
Figure 9:
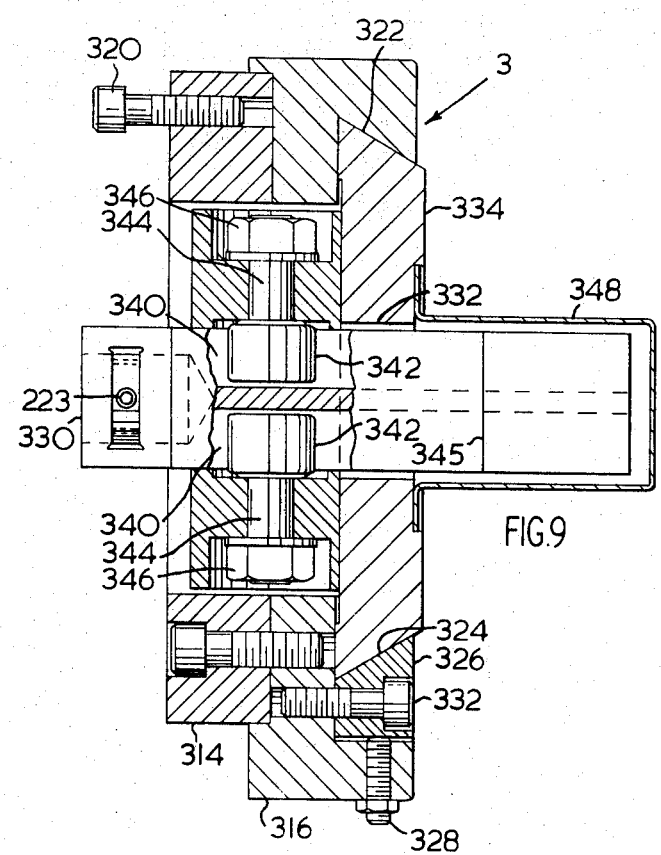
Figure 10:
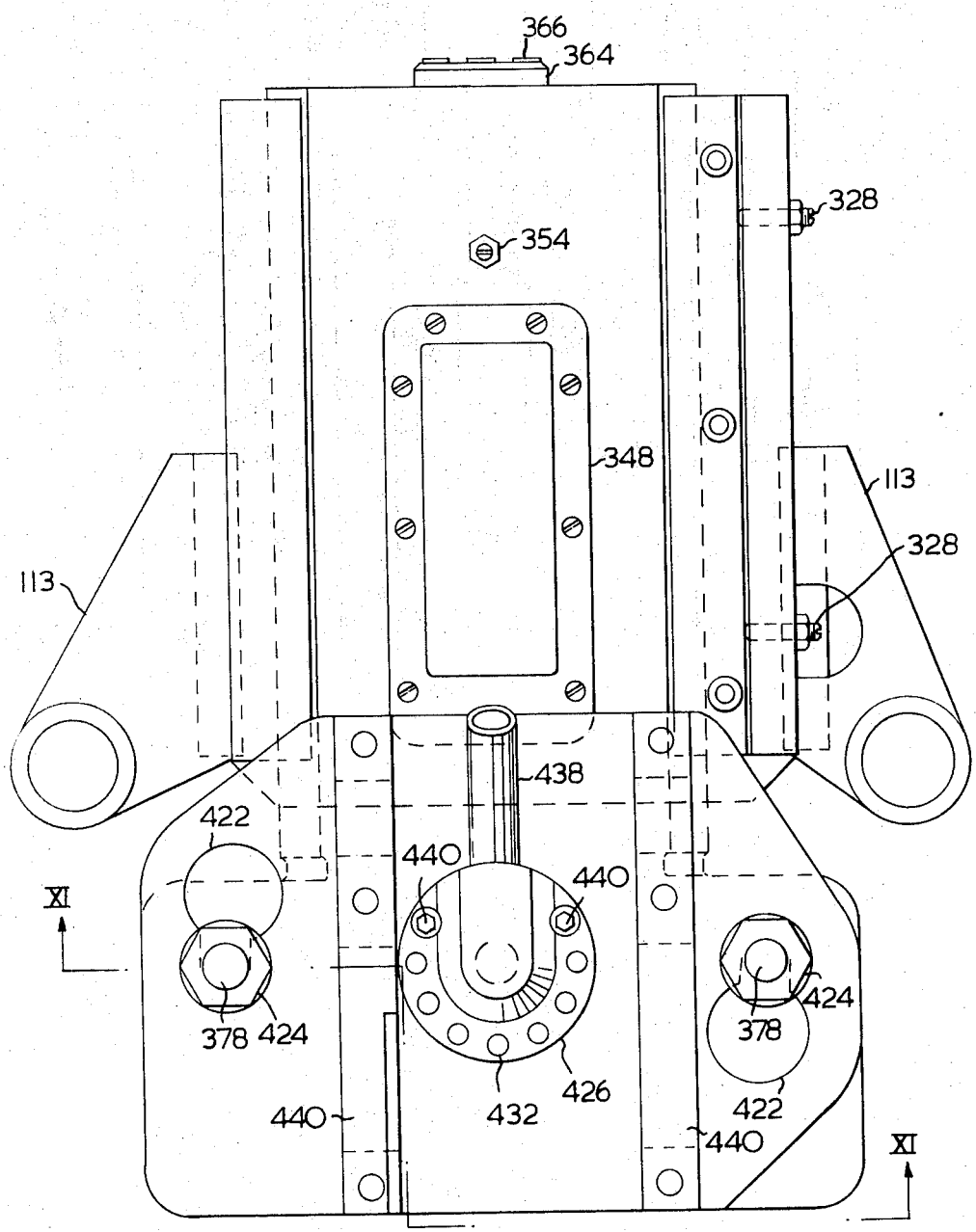
Figure 11:
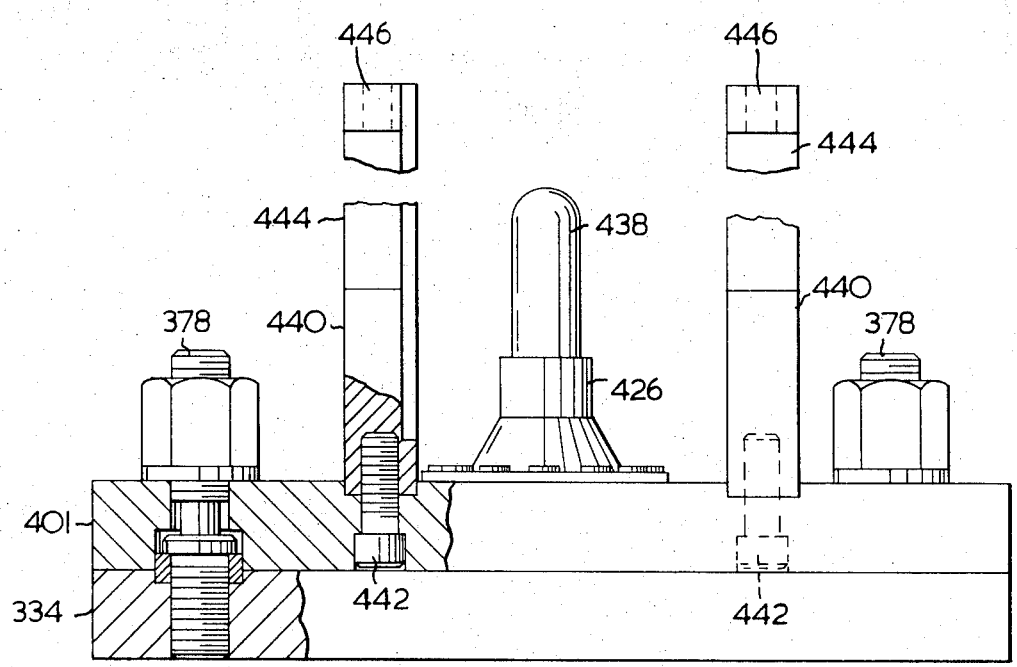
Figure 12:
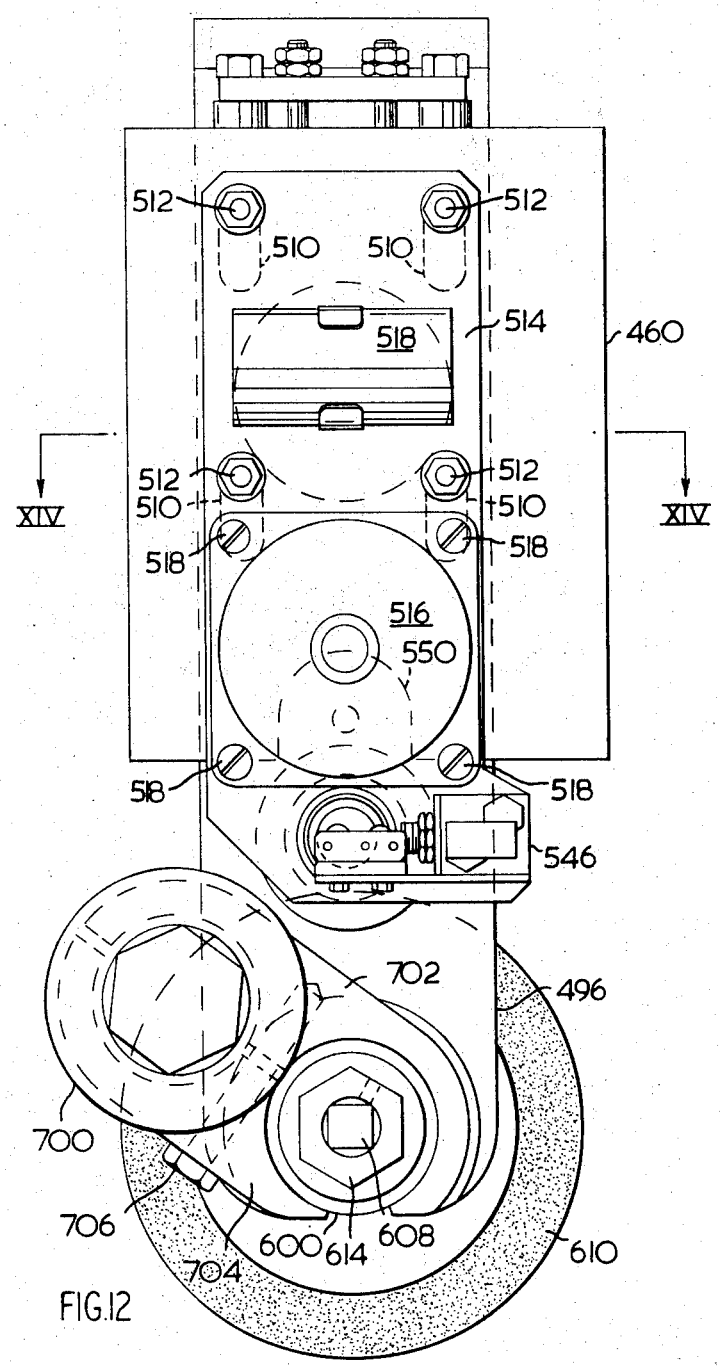
Figure 13:
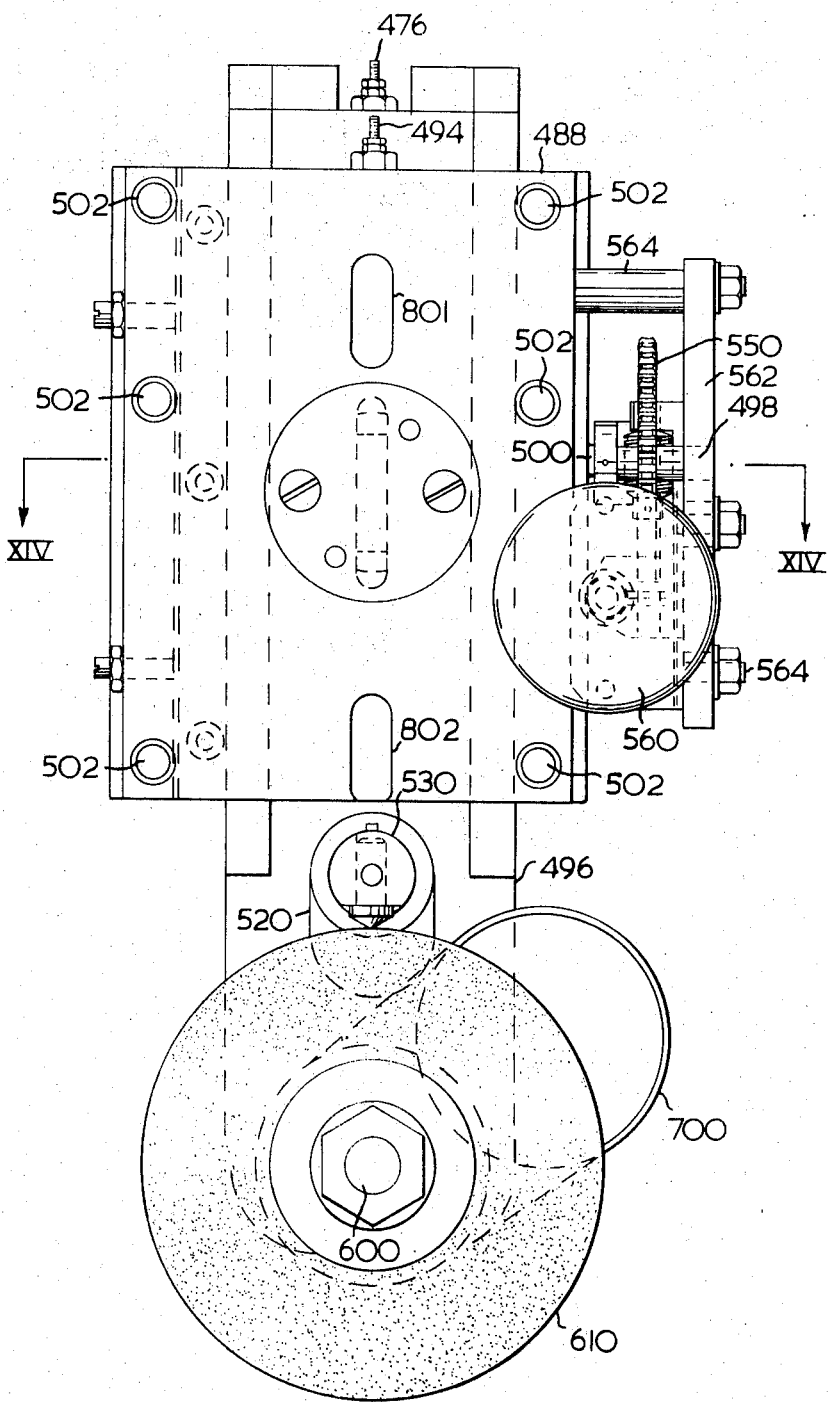
Figure 15:
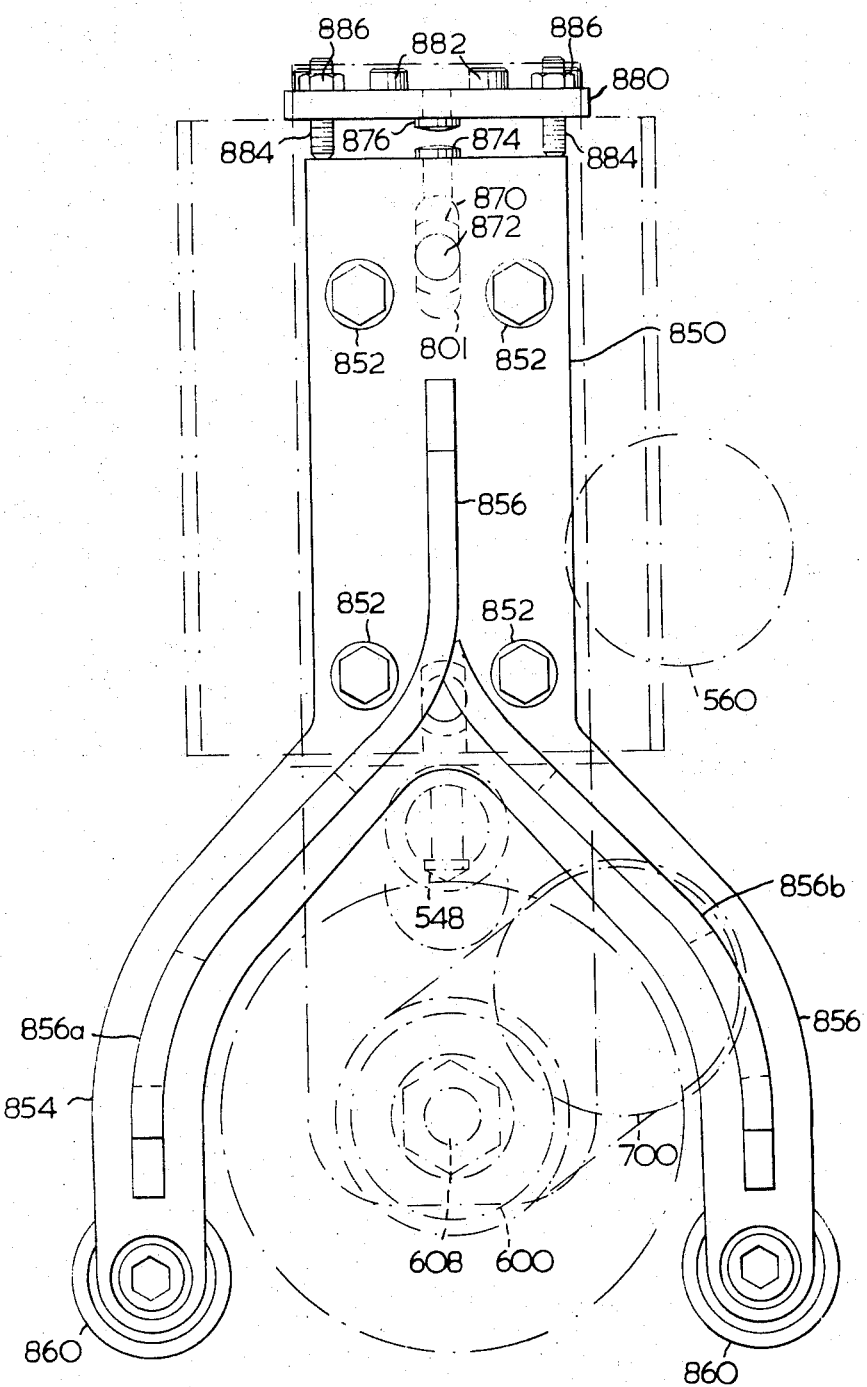
Figure 16:
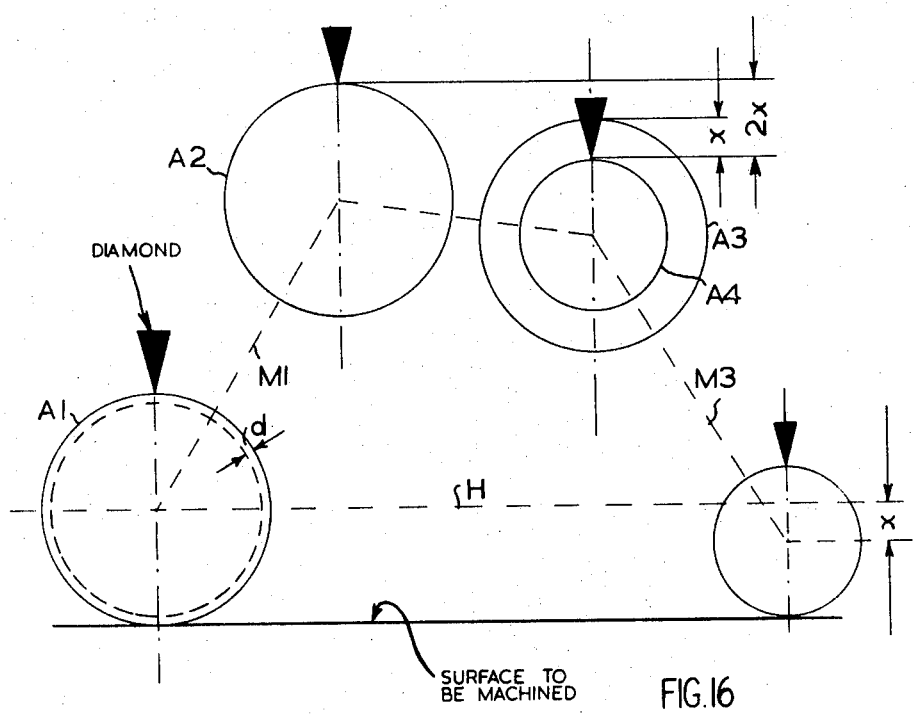
Figure 17:
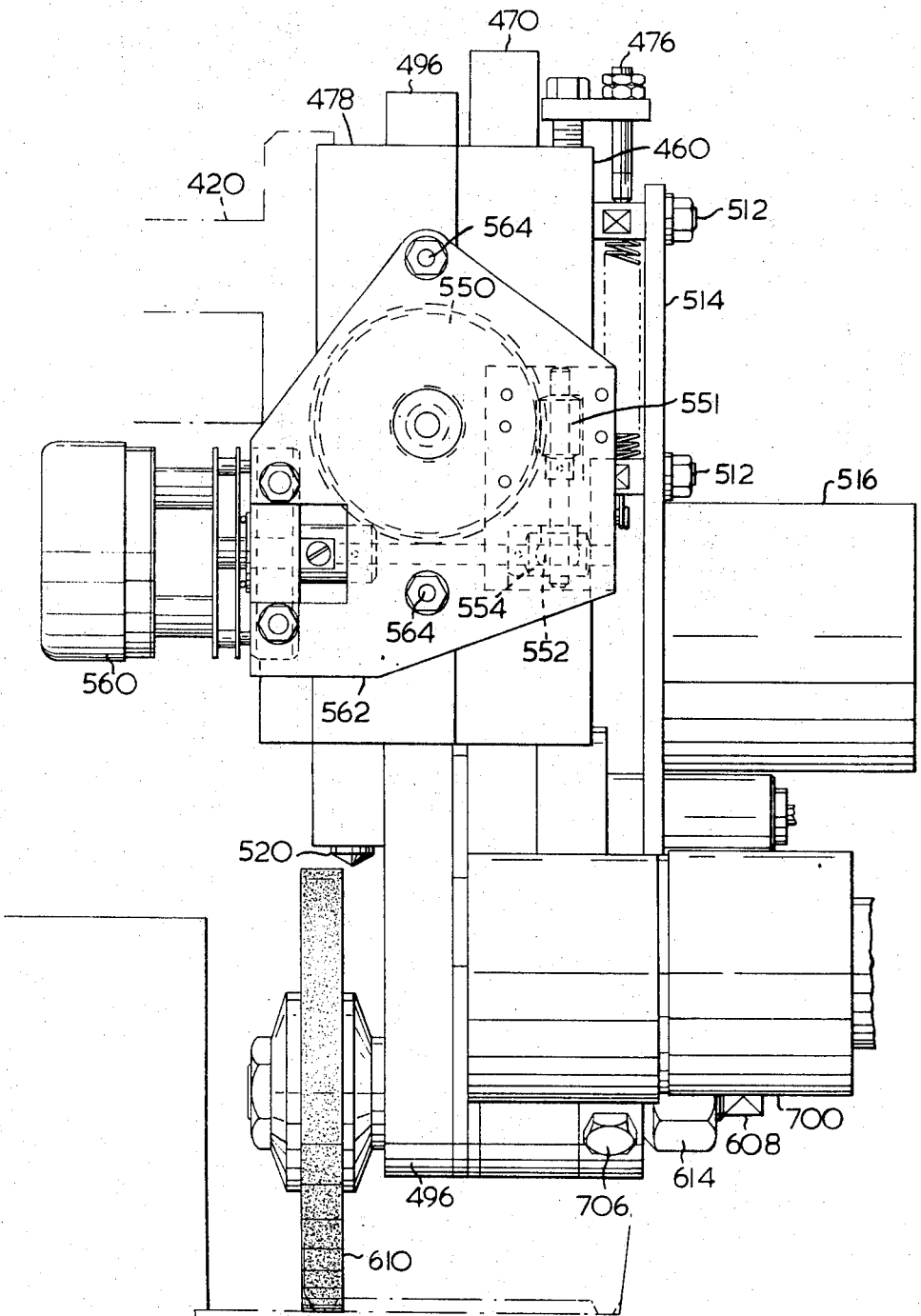
Figure 18A:
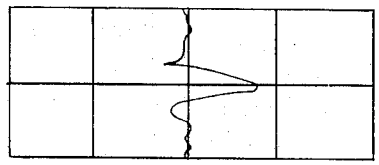
Figure 18B:
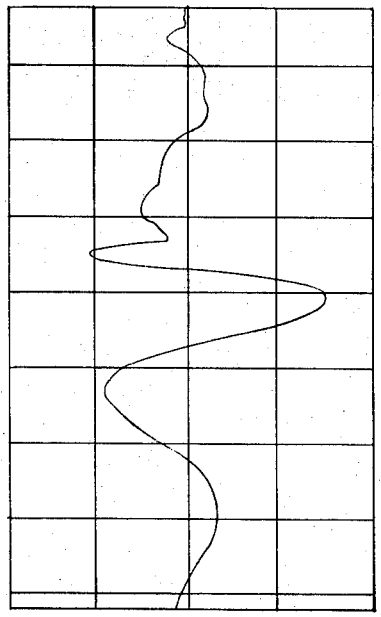

Preferred embodiments of the invention will now be described with reference to the accompanying drawings, in which:

FIG. 1 is a side elevation, partly in section, of nuclear reactor facility, with the reactor vessel removed showing the lower header on a carriage and the remotely operated tool in various position, FIG. 2 shows, in cross section, a pair of mating seal elements requiring a high degree of surface precision, FIG. 3A is an oblique projected view of the present invention showing the main components, of the tool assembly, FIG. 3B and 3C are an end view of the elements within the main stem shown in FIG. 3A and a section of part of the stem, FIG. 4 is a diagram showing the interrelationship between FIGS. 4A—4F, FIGS. 4A—4F is a side view, in section of one of the arms of the tool assembly shown in FIG. 2, FIG. 5 is part of the view seen from the direction of arrows V-V in FIG. 4B, in part section, FIG. 6 is part of the view seen from the direction of arrows VI-VI in FIG. 4C, in part section, FIG. 7 is part of the view seen from the direction of arrows VII-VII IN FIG. 4D in part section, FIG. 8 is part of the view seen from the direction of arrows VIII-VIII in FIG. 4D, FIG. 9 is part of the view seen from the arrows IX-IX in FIG. 4D in part section, FIG. 10 is a partial view in the direction of arrows X-X in FIG. 4E, FIG. 11 is a partial view in the direction of arrows XI-XI in FIG. 10, in part section, FIG. 12 is a view from the direction of arrows XII-XII of the slide assembly shown in FIG. 4F, the mounting bracket being omitted, FIG. 13 is a view of the slide assembly shown in FIG. 4F taken in the direction of arrows XIII-XIII, FIG. 14 is a section of the slide assembly taken approximately along the lines XIV-XIV in FIGS. 4F, 12 and 13, FIG. 15 is a simplified end view of the slide head viewed in the direction of arrows XV-XV in FIG. 4F, FIG. 16 is a diagram showing the pertinent increments involved during a redressing operation, FIG. 17 is a rear view of the head shown in front view in FIG. 4F, FIGS. 18A and 18B show a recording of surface profilometer readings on a seal surface.

No attempt should be made to find exact correspondence between any one of the drawings with other drawings. Some components have been omitted entirely from certain views in the interest of clarity. Further, some views have been reversed from that seen by standard projection techniques in order to show a particular component or section to the best advantage.

Referring now to the drawings, FIG. 1 shows, by way of introduction, the type of problem for which the present invention provides a solution. The figure shows, in cross section, a nuclear reactor wherein the reactor vessel has been displaced from beneath the boiler section thereby exposing the upper header seal on the boiler section. This seal together with the lower head seal required to be reconditioned by remote operation in view of the highly activated radioactivity in the area. The drawing shows various access ports in the biological shield and an access hole down through the center of the boiler section. In the present application this central hole is 4.7 inches diameter and the flange seals to be reconditioned were about 11¼ feet in diameter. The vertical height of deck plate elevation above the main floor elevation was 28 feet 7 7 inches and between the pit floor and the main floor elevation was 30 feet.

The vessel is secured against header flanges by 72 bolts extending from deck-plate elevation to threaded inserts in the upper aluminum-vessel flange, and 72 bolts through the lower header assembly to the lower vessel flange. The stainless steel upper header sealing flange is built into the reactor structure. The lower header sealing flange is an integral part of the lower header assembly. Flange seals had to be water- and gastight when the vessel is reinstalled.

Referring now to FIG. 2, there is shown at $a$, a stainless steel header seal and at $b$, part of the vessel flange formed of aluminum. The seal contact requires 16$\mu$-inch surface finish and elsewhere a 32$\mu$-inch surface finish is required. The header $a$ is shown to include a 5° tapered spigot which closely cooperates with the vessel flange $b$.

The inaccessibility of both headers (FIG. 1) dictates the complexity of the tool. The upper and lower header seals, in a gamma field estimated at 20,000 R/h on contact, must be reached vertically downward through the central 4.7-in.-diam. hole and horizontally to the radius of the seal. The lower header is shown resting on a carriage in the position from which the vessel will be removed. While this appears to be an easier location in which to work, there are other complications. Since one of the prime concerns is to prevent dust, dirt, etc. from falling into the fuel rod cups during cleanup operations, a protective cover is remotely located on the lower header during work on the seal surface.

The tool is a three-armed spider attached at its center to a vertical main drive stem (FIG. 3A). Various tool and inspection heads are carried and manipulated at the end of each arm. A special carriage with universal tool attachments is located at either the upper or lower access port and toolheads can be remotely attached, removed, or replaced through the 13-in.-diam. horizontal, 15-ft.-long access port (FIG. 1).

For work on the upper seal, toolheads are changed by lowering the tool arms to the appropriate port elevation and rotating the spider to the correct radial position. For the lower header seal, the access port is at the correct elevation.

On the end of each arm (FIG. 3A), two-pronged rocking members carry rollers that locate on the seal surface. Adjacent to these rollers two other rollers contact the 5° spigot diameter and one centralizing roller was rigidly fixed on two of the arms, while the other two rollers plus two on the third arm were spring loaded. The complete roller and tool arm assembly must be indexed through 180° to permit cleanup of the upper and lower seals. The application slide on Arm No. 1 is a radially located hydraulically against any of eight stops to the desired working position. The slide for advancing the toolhead to the seal surface is also operated hydraulically. Application slides on the other two arms are driven by air motor and lead screws; radial oscillating motion for honing, lapping, and wire brushing is provided by a mechanically driven cam. All motions of the arms and application slides are remotely controlled from the consol. The main drive stem is remotely connected or disconnected from the main stem upper section (FIG. 3A) at an elevation that permits its passage on the carriage to the lower reactor cavity (FIG. 1).

The main drive stem and upper extension is constructed from 4⅝-in.-OD × 5/16-in.-wall steel tube and machined and welded inserts and end plug and is shown generally in FIG. 3B. The many control lines that pass through these sections must also be remotely connected and disconnected. These include four hydraulic lines, three air lines, one waterline, 30 electrical leads, one locking plunger, one drive shaft, and 1½-in.-diam. borescope (FIGS. 3B and 3C).

The main stem has two driving inserts at different positions which allow the tool to operate at either main-floor or deckplate elevations. These driving inserts engage with the main-drive gearbox unit in which built-in hydraulic cylinders preload the rollers on each arm against the seal surfaces. For the lower header, the weight of the complete tool—approximately 1,500 lb.-less 250-lb. preload, is taken by the hydraulics. For the upper header, the weight of the complete tool plus 250-lb. preload, is taken by the hydraulic jacks. The main-drive gearbox rotates the tool at the desired speeds. To prevent torsion "wind-up" of the main drive stem, air-powered auxiliary drive units on Arm No. 1 operate soft rollers on the seal surface. An accessory drive gearbox on top of the main-drive extension stem provides cam-operated oscillating motion for two arms. The borescope viewing head protrudes radially from the center stem between two arms. It is also remotely rotated through 180° to allow viewing of both upper and lower header seals. Vacuum cleaning equipment will be remotely clipped into tool arms through the access ports in a suitable position for collecting debris. Remotely prepositioned floodlights and a television camera within the reactor cavity provide viewing of toolheads during operations.

The foregoing describes in broad terms the overall requirement of the invention. The invention will now be described in detail with reference to Arm No. 3 shown in FIG. 3A.

Referring now to FIGS. 4, 4A—4B and 5—15 Arm No. 3, generally indicated at 1, supports an indexing head 2, a hydraulically operated vertical application slide, generally indicated at 3, which in turn supports a grinding head generally indicated at 4.

The arm comprises a tube 101 extending from an end cap 102 towards the indexing head 2. The tube 101 is provided with convergent bracket members 103A and 103B, shown best in FIG. 5, and these brackets together upstanding plates 104A and 104B serve to mount the entire assembly 1, 2, and 3 on the main stem shown in FIG. 3A.

Inside tube 101 there is an inner tube 201 which is supported for rotation about and longitudinal sliding in tube 101 by the provision of bearings 106A and 106B.

A pair of rings 107A and 107B are fastened to the tube 101 by means of dowels 108. A slide-locating plunger 109 having a tapered end is carried in a breach 110 and a handle 111 serves to move the plunger 109 against the action of a compression spring 112. A slot 113 extending longitudinally of the tube 101 receives the handle 111 and allows sliding of the latter. A first support plate 120 is mounted for rotation about tube 101. Plate 120 has two tapered apertures 124 therein and provides two index positions 180° apart between the plate 120 and the tube 101. A second support plate 122 is rigidly joined to support plate 112 by means of studs 114'. Support plate 122 includes a journal bearing 114 including a flange 115 at one end thereof. The journal bearing 114 slidably receives the inner tube 201. Thus, the withdrawing of plunger 109 from apertures 124 provides for indexed relative positions of plates 120 and 122. At one end of the tube 101, there is provided a hydraulic linear actuator 116 supported by plates 117 secured to the tube 101 by screws 118. Movement of the actuator in one direction or the other is controlled by fluid pressure selectively applied via unions 119.

One end of the inner tube 201 receives an end cap 202 attached by means of screws 203. A saddle member 204 is secured to end 202 as by screw 205. The end 202 receives a plug member 209 having a recess 206 therein for cooperation with saddle member 204. The plug member 209 is joined to a pushrod 207 whose opposite end is joined to the ram of the actuator 116. Thus, the inner tube 201 may be selectively moved to and fro within the outer tube 101. A slot 240 in the inner tube 201 cooperates with a key 242 in plate 122 allowing longitudinal movement of the inner tube 201 but at the same time ensuring that the inner tube is rotated with the plate 122. The support member 122 includes a plurality of clearance holes 211 and the inner tube 201 is fitted with flange members 212, 314 and 316. The journal member 114 with its flange 115 receives an index plate 218 which is attached by screws 220 to a ring gear 222. The index plate 218 and the ring gear 222 may be rotated selectively by means of motor 224 fitted within pinion 226 which meshes with the ring gear 222.

The index plate 218 includes an indexing depression 228, as best seen in FIG. 7, which cooperate with microswitches 230. The microswitches 230 with associated circuitry are used to preselect given angular positions of the index plate. Attached to flange members 212, 314 and plate member 316 is a series of end stop pins 232 which selectively cooperate with the clearance holes 211.

There are actually eight pairs of index pins 232, one of each pair being spaced 180° from its mate. The ends of the index pins 232, marked "A" in FIG. 4D, are disposed at a specified dimension from the face of flange 212 marked "B" on the same drawing so that the face "B" acts as an end stop during movement of the tube 201 in the left wise direction. The fixed plate 218, an index plate 222 each contain seven pairs of clearance holes whereas the plate 122 contains eight pairs of clearance holes. This provides space for the reception of an alternative and longer type of stop 232. When the tube 201 is moved fully to the right, i.e., with the index pins 232 disengaged from the plates 218 and 222 indexing is effected. Thereafter, the tube 201 is returned to the left where surface "A" of pins 232 is clamped against the selected blank position in plate 218. Movement to the right of the inner tube 201 is restricted such that the index pins 232 are withdrawn from the holes 211 in the support plate 113.

The inner tube 201 is provided a further hydraulic ram, generally indicated at 213, and supported in the tube by plates 210A and 210B fastened to the tube 201 by screws 215. The ram 213 has a first feed system comprising pipe 214a, expansion coil 214b, and union 214c, and a second feed system comprising pipe 216a, expansion coil 216b and a union 216c. The hydraulic ram 213 is fitted with a piston rod 219 which joins and moves a cam block 330 which is connected thereto by a pin 223.

Referring particularly to FIGS. 8 and 9, the vertical application slide 3 will now be described. As stated before, the vertical application slide 3 includes a flange 314 which is fastened as by screws 318 to the flange 212 on the end of inner tube 201. Plate 316 is fastened to the flange 314 by screws 320. The plate 316 includes a slide dovetail formed by a fixed dovetail surface 322 and an adjustable surface 324 forming part of an adjustment pad 326 whose position is established by adjustment screws 328. The pad 326 is fixed in its adjusted position by screws 332. A vertical slide member 334, free to slide between dovetail surfaces 322 and 324, is attached to cam block 330. The flange 314 includes apertures 327 and 328 and plate 334 includes an aperture 332, the cam block 330 being free to move to and fro within the three apertures while the cam block 330 rests on a guide 335 fastened to the flange 316 as by screws 338. (See FIG. 4D) The cam block 330 includes a pair of inclined slots 340, into which roll a pair of rollers 342 which are free to slide. The rollers rotate on pivots 344 bolted into the cam block 330 by means of nuts 346. Thus, when the ram 213 moves the cam block 330, the slide 334 is raised or lowered. Cam block 330 is provided with an extension 345 which serves as a stop for movement of the block to the leftward direction.

A cover 348, bolted to the slide 334, protects personnel against the movement of the cam block 330. Plate 316 is slotted as at 350 to receive a stop pin 352 fastened to the slide 334. The stop pin cooperates with a microswitch 354 to provide a suitable electrical signal indicating that the upper limit of travel of the slide 334 has been reached. A stop 364 fastened to top of the plate 334 by screws 366 sets the lower limit of travel of the plate 334.

At the lower part of the vertical application slide 334 there is provided a pair of holes 376 for receiving studs 378 (see FIGS. 10 and 11) for fastening an extension box 420 to be described. The slide 334 is fitted with an air supply union 370 having a tapered end 380. The plate also includes a plurality of locating bushes 372 arranged on a common pitch circle, see FIGS. 8 and 10, and each provided with a separate electrical supply 374.

Each bush 372 includes a counterbore 373.

Referring now particularly to FIGS. 8 and 10 together with the general view shown in FIGS. 4E and 4F, a mounting plate 401 is fastened to the slide 334 bolts 378 as previously discussed. Plate 401 includes keyhole-shaped holes 422 permitting passage therethrough of nuts 424 during assembly. Such assembly requires a slight rotary action so that plate 401 is provided with a gland block 426 having a tapered surface 428 and seal 430 for cooperation with the tapered end 380 on the union 370. The block 426 is also provided with a plurality of sliding electrical contacts 432 (see FIG. 4E), arranged a common pitch circle of the same radius as that for items 372 and 374. Each contact 432 is urged towards plate 334 by means of a spring 434 and each contains a mushroom head pin 436 for snug and selective cooperation with fixed contacts 373. The gland block 426 is provided with an output pipe 438 and the block is fastened to the plate 401 by means of screws 440.

Referring now to FIG. 4, 4F and 11, there is shown a pair of sideplates 440 which are recessed into the plate 401 and secured thereto by screws 442. Each side 440 includes an aperture 444.

The grinding head, generally indicated at 4, will now be described. The grinding head 4 is fastened to the pair of plates 440 by means of screws, not shown, through holes 446 best seen in FIG. 11.

Referring again to FIGS. 4F and FIGS. 12, 13 and 14, the grinding head, generally indicated at 4, will be described. A plate 460, is supported by the pair of plates 440 as previously discussed. The plate 460 includes a fixed dovetail guide 462 and an adjustable dovetail guide 464 whose adjustment is first set by screws 466 and subsequently locked by screws 468. A dressing slide 470, which is movable between the guides 462 and 464 includes a rack 472. Referring to FIG. 4F it will be seen that the rack can be moved to the left or right to provide tight pitch line contact by means of a wedge 474 which cooperates with an inclined surface on the back of the rack. The position of the wedge 474 is established by adjustment means 476. A further plate 478 has a fixed dovetail surface 480, an adjustable dovetail 482, adjustment screws 484 and locking screws 486. A wheel slide 496 is free to slide between the respective dovetail surfaces of items 480 and 482.

A fixed rack 490 is recessed into the plate 478. The rack 490 is provided with adjustment means comprising wedge 492 and screw 494. The slide 496 carries a shaft 500 journaled therein for rotation about an axis transverse to the direction of movement of the slide. A pinion 501, fastened to the shaft 200, is maintained in close mesh with racks 472 and 490. As previously mentioned the plate 460 is supported by the pair of sideplates 440. Plate 478 is in turn fastened to plate 460 by means of screws 502 see FIG. 13).

The plate 460 includes four elongated apertures 519 (see FIG. 4F) through which pass four studs 512 which screw into and move with the dressing slide 470. The studs 512 support a motor mounting plate 514 which in turn carries a motor 516 which is secured by screws 518 (see FIG. 12). A starter capacitor 518 is also mounted on the plate 514.

The wheel slide 496 includes an elongated aperture 520 through which passes a journal bearing 522 rigidly mounted in the lower part of the dressing slide 470. A thrust bearing 524 is likewise rigidly mounted on the slide 470 by screws 526. Between the thrust bearing 524 and the journal bearing 522 there is provided a nut 528 having gear teeth formed on the periphery thereof. A shaft 530 is carried in the journal 522 and is restricted to longitudinal movement by a lengthwise slot 532 in the journal cooperating with a key 534 let into the shaft. The shaft 530 is threaded at 536 for engagement with nut 528. An extension member 538 screwed into the shaft includes shoulders 540, 542 for cooperation with a pair of microlimit switches 546 (See FIG. 12). A diamond and mount 548 is provided at the right-hand end of the shaft 530. The plate 460 includes a recess 550 adjacent its lower end to accommodate a pinion 552 mounted on the shaft of the motor 516, the pinion meshing with the teeth on the nut 528. By these means the diamond 548 may be moved to and fro along the axis of the shaft 530.

The outer end of the shaft 500 which carries pinion 501 is fitted with a worm wheel 550 which is drivable by a worm 551 (See FIG. 17). The worm 551 in turn is driven by a worm wheel 552 which in turn is driven by a worm 554 shaft coupled to a rotary solenoid 560. The outer end of the shaft 500 is supported by a bearing plate 562 which is fastened to the wheel slide 496 by means of studs 564, also supports the worm 551, worm wheel 552, worm 554 and the rotary solenoid 560 together with associated bearing blocks and shafts, etc.

Referring particularly to FIGS. 4F, 12, 13, 15 and 17, the lower end of the wheel slide 496 is provided with a bearing housing 600 recessed into and attached to the slide by means of screws 602. The housing accommodates deep groove ball races 604 and 606. A spindle 608 is carried by the bearings and is adapted to receive either a flat grinding wheel or, as shown, an offset grinding wheel 610. A belt pulley 612 is keyed to the shaft 608 between the races 604, 606. Adjustment for end play is made with the use of a thrust nut 614 and spacers. FIG. 12 shows an air motor 700 whose body includes a clamp portion comprising an integral extension 702 and a floating portion 704. A clamp portion is adapted to embrace the bearing housing 600 and to be clamped thereon by clamping screws 706. A belt, a portion of which is shown at 708 in FIG. 4F, provides driving connection between the air motor 700 and the shaft 608.

In certain applications vertical steadying means may be desirable and these means are shown in FIGS. 4F, 13 and 15. Plate 488 includes a pair of elongated guide slots 801, 802. A yoke member 850 is rigidly fastened to plate 488 by means of screws. The lower part of the yoke is bifurcated to form independent arms 854, 856 the yoke as a whole being reinforced by a rib comprising portions 856, 856a, 856b welded to the yoke. The lower end of arms 854, 856 are provided provided with bearing bosses 858 and ball bearings 860 and associated attachment means. In order to provide some vertical adjustment between the yoke 850 as a whole and the grinding head proper, the yoke is provided with a pair of accurately machined spigots 870 whose shanks 872 are a drive fit into the yoke, as best seen at the tops of FIGS. 4F and 15. The upward limit of vertical movement of the yoke relative to the grinding head is determined by interaction between a pad 874 on the top of the yoke and a further pad 876 mounted on a stop plate 880 rigidly attached to the top of plate 488 by means of screws 882. Intermediate positions may be obtained by means of setscrews 884 whose final setting may be locked by nuts 886.

Operation of the apparatus will be described.

It is first assumed that the grinding wheel 610 has already machined a portion of the desired surface, shown in chain-dotted line at A in FIG. 4F, and that wheel dressing is necessary. The grinding head, generally indicated at 4 is first raised, so that the grinding wheel clears the surface being ground, by pressurization of the right-hand end of the hydraulic ram 210 and the resultant movement of the cam block 330 to the left.

After withdrawal of the head from the work surface, the rotary solenoid 560 is pulsed to rotate the pinion 501 in the appropriate direction to lower the wheel slide 496 by say 0.002 inches. Since rack 490 is fixed to head, the pinion 501 will carry the wheel slide 496 downwardly by 0.002 inches. The rack 472 will move the dressing slide 470 downwardly by twice the amount so that the diamond 548 will move down 0.004 inches. Simultaneously with the activation of the rotary solenoid 560, motor 516 is energized, so that as soon as the rotary solenoid 560 has been pulsed an appropriate number of times depending upon the amount to be dressed off the wheel, the diamond 548 will start traversing across the edge of the grinding wheel 854. Thus, after dressing of the wheel, the head may be dropped to its initial position by reversal of the ram 213 whereupon the new surface of the wheel will be precisely in the correct position for continued surfacing of the ground surface. Accurate vertical relocation of the head is ensured by reestablishment of contact between the rollers 860, and the surface being machined.

The redressing technique discussed in the preceding paragraph is well illustrated with reference to FIG. 16. Line H represents the distance of the head 4 from the surface to be machined. Circle A1 represents the position of the wheel just prior to a redressing operation and its diameter will have been nominally established by a previous traverse of the diamond shown. The slightly smaller circle, shown dotted, separated from A1 by d represents the depth of the cylindrical surface of the wheel containing discontinuities or other damage requiring redressing of the wheel. The value of d will not necessarily be equal to the value of X. The latter value will normally slightly exceed the value of d. During the redressing operation the wheel is withdrawn from the work as represented by line M1, which is an arbitrary amount, up to position A2. As stated previously the rotary solenoid 560 is then pulsed so as to advance the axis of the grinding wheel by a distance equal to X units, as shown at A3 and in view of the novel rack and pinion configuration. The diamond is advanced by 2X and after the diamond has dressed the wheel the diameter of the wheel will be reduced to that shown at A4. The values of X, 2X and the reduction in the final diameter of the wheel at A4 have been shown grossly exaggerated. After redressing the head is accurately returned to the original datum H, as represented by the line M3. Thus, in spite of the fact the head is back to its original position the wheel is nearer to the surface being machined by X units. As stated previously in the embodiment described movements of the axis of the wheel, the dressing shaft, which are parallel to each other, are effected in a common plane which is perpendicular to the surface being machined. This also applies to withdrawal of the head and the subsequent return thereof after redressing. Provided the head is returned to its original position such movements may be effected in planes other than the perpendicular plane referred to.

In summary therefore, the grinding head mechanism can automatically and remotely withdraw the head from the work, dress the grinding wheel, compensate for the reduction in wheel diameter due to dressing, and return the wheel to a revised position for continued machining.

Referring to FIG. 4F, it will be noted that, apart from the yoke 856, the grinding wheel extends beyond the head 4. In certain circumstances it is advantageous to locate the grinding wheel inside the major part of the head. Such an arrangement is shown in FIG. 17 from which it will be seen that the wheel slide side of the head is attached to the bracket 420. While the foregoing has been described with reference to the grinding of a surface with the grinding head above the work, it will be appreciated, particularly by reference to FIG. 4D that the grinding head may be inverted to that the machining of the underside of a circular body may be accomplished.

Profilometer tests carried out on an 11-foot 6-inch diameter flange revealed that depth variations did not exceed ±0.001 inch when the work was ground, the head withdrawn, the wheel dressed, the head returned to the surface and grinding resumed. Further, a worn wheel could be replaced, the new wheel dressed and used to continue the grinding operation with no variation in depth of cut. Typical profilometer recording are shown in FIGS. 18A and 18B.

It is seen that provided relocation of wheel in relation to the surface being machined is accurately established after redressing of the wheel, diametral movement of the wheel by the accurately determined increment and the subsequent parallel movement of the dressing shaft may be carried out in a common plane which may not necessarily be perpendicular to the surface being machined. It is of course necessary that the axis of the dressing shaft be parallel with that of the wheel.

I claim:

1. A toolhead for a machine tool having means defining a cylindrical cutting surface, said head having integral redressing means for precisely compensating for wear on the cylindrical cutting surface of the tool, said head comprising:
   a. shaft and bearing means providing an axis about which said tool may rotate,
   b. slide means supporting said bearing, said slide means including freely rotatable pinion thereon,
   c. a dressing device,
   d. a slidable support means for said dressing device whereby the dressing device is engageable with the cylindrical cutting surface of said tool and whereby the dressing device is constrained to move along an axis which is parallel to and in the same plane as the said shaft,
   e. said first rack means rigidly attached to said support means for said dressing device, said first rack means meshing with said pinion,
   f. second rack means rigidly attached to said toolhead, said second rack means meshing with said pinion, and,
   g. means for moving the axis of the said shaft by a determined distance X, the movement occurring in the said plane whereby the said pinion rolls on said second rack and whereby the said first rack and said dressing device move, by an accurately determined distance 2X, the dressing device moving toward the said tool.

2. A toolhead as defined in claim 1, wherein said means slidably supporting said dressing device is a shaft upon which the dressing device is mounted, a portion of said shaft being threaded for engagement with an internally threaded member which is constrained against movement along the axis of its thread and supported for rotation, said shaft incorporating means inhibiting rotation about the axis of the shaft.

3. A toolhead as defined in claim 1 further including means for selectively moving the head bodily away from its machining position prior to tool redressing and to returning and to accurately repositioning the head in its original position after a redressing operation.

4. A toolhead as defined in claim 8 wherein the said means for selectively moving the head comprises an inclined plane and a follower resting on the inclined plane, the latter and the follower being movable with respect to each other, the movement being provided by a linear actuator.

5. A toolhead as defined in claim 2 wherein said internally threaded member is mechanically coupled to a prime mover.